United States Patent [19]

Hostetler

[11] 4,411,572
[45] Oct. 25, 1983

[54] BALE TRANSFER CARRIER

[75] Inventor: Dewey Hostetler, Harper, Kans.

[73] Assignee: DewEze Manufacturing, Inc., Harper, Kans.

[21] Appl. No.: 294,776

[22] Filed: Aug. 20, 1981

[51] Int. Cl.³ ............................................. A01D 87/12
[52] U.S. Cl. .................................. 414/24.5; 298/8 R; 298/9; 298/18; 298/38; 403/4; 414/470
[58] Field of Search ..................... 414/24.5, 24.6, 470, 414/684, 910, 911; 298/1 R, 8 R, 9, 10, 18, 38; 296/3, 6, 184; 410/42, 49, 50; 105/270, 272, 105/274, 275, 455; 280/404; 403/3, 4; 248/558

[56] References Cited

U.S. PATENT DOCUMENTS

| Re. 29,455 | 10/1977 | Slayton | 296/6 X |
|---|---|---|---|
| 1,158,291 | 10/1915 | Rickards | 298/9 X |
| 2,542,321 | 2/1951 | Forss | 298/18 |
| 2,632,533 | 3/1953 | MacKenzie | 403/4 X |
| 3,323,838 | 6/1967 | Trucco et al. | 298/8 R |
| 3,568,785 | 3/1971 | Gray | 280/404 X |
| 3,922,036 | 11/1975 | Kalsbeck et al. | 298/18 |
| 4,079,966 | 3/1978 | Vansickle | 298/8 R |
| 4,092,050 | 3/1978 | Sobeck | 298/18 |
| 4,138,159 | 2/1979 | Hall | 298/18 |

FOREIGN PATENT DOCUMENTS 741700 8/1966 Canada .................................. 298/9

Primary Examiner—Leslie J. Paperner
Attorney, Agent, or Firm—Litman, Day & McMahon

[57] ABSTRACT

A carrier for cylindrical bales of hay utilizes a single, elongate, tubular main body member with an axle and wheels mounted thereto for movement and drafting as a trailer. A plurality of bale supporting cradles are mounted along the main body member at intervals. The cradles are rotatable about a vertical axis for selectively carrying the bales with the bale longitudinal axes either longitudinally or transversely aligned to the main body member for loading by various types of equipment. The cradles are also tiltable from side to side of the main body member by a latch extending between the main body member and a cradle pivot structure to allow gravitational force to tilt the cradle and drop the bale onto the ground.

3 Claims, 13 Drawing Figures

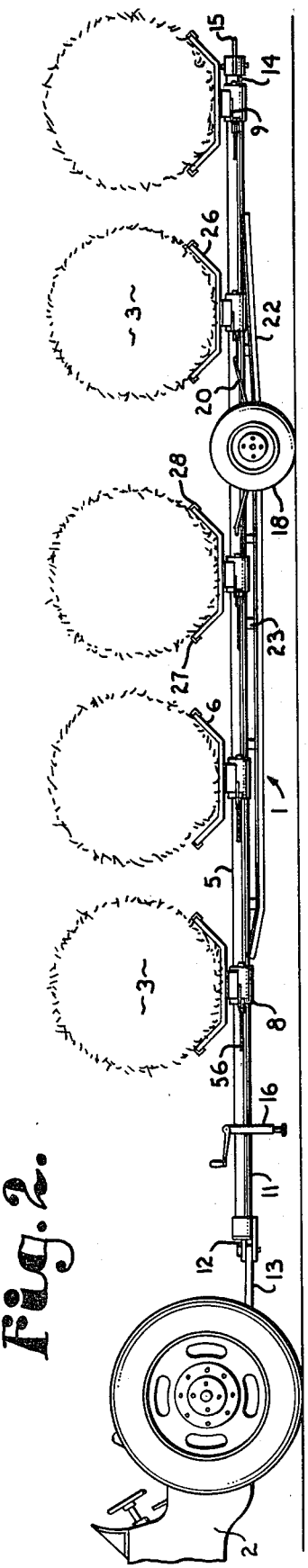
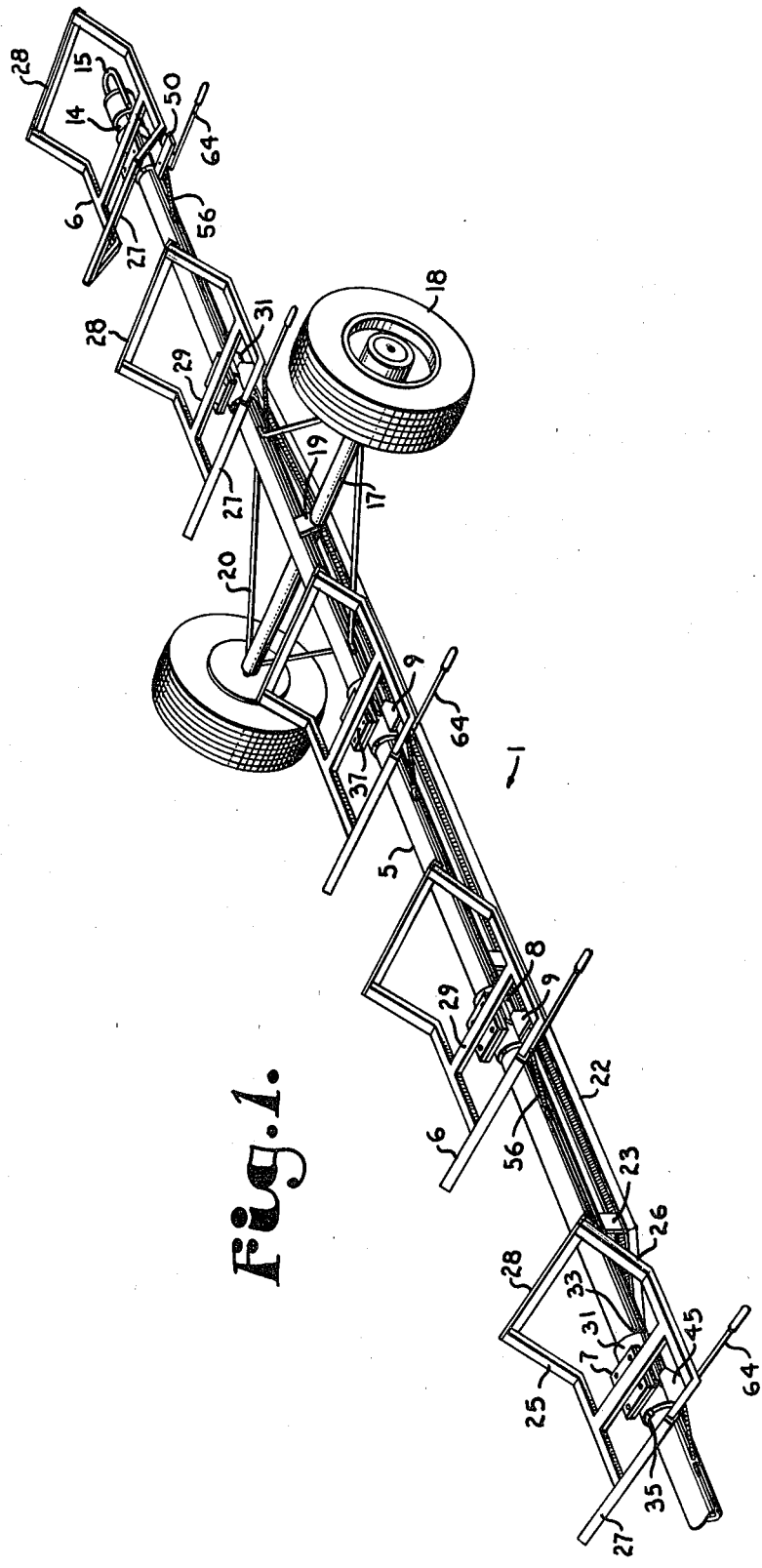

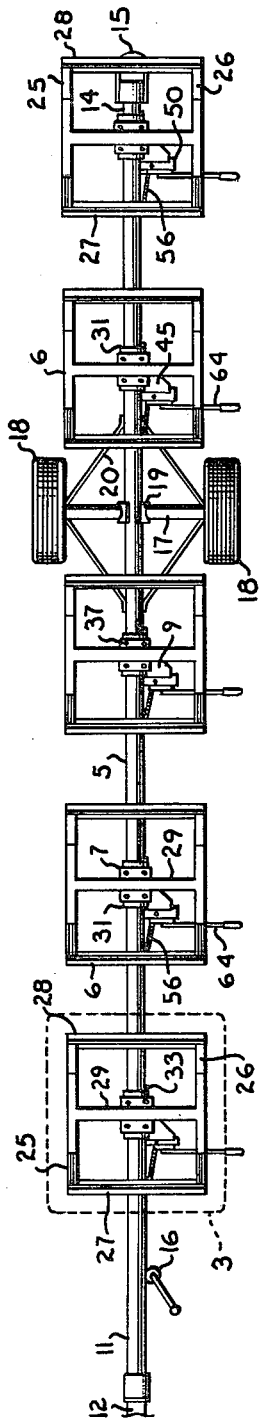
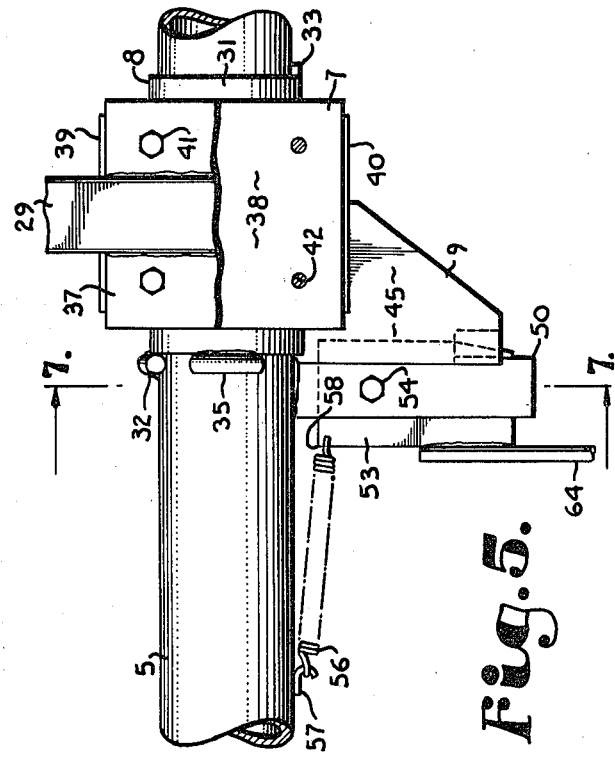
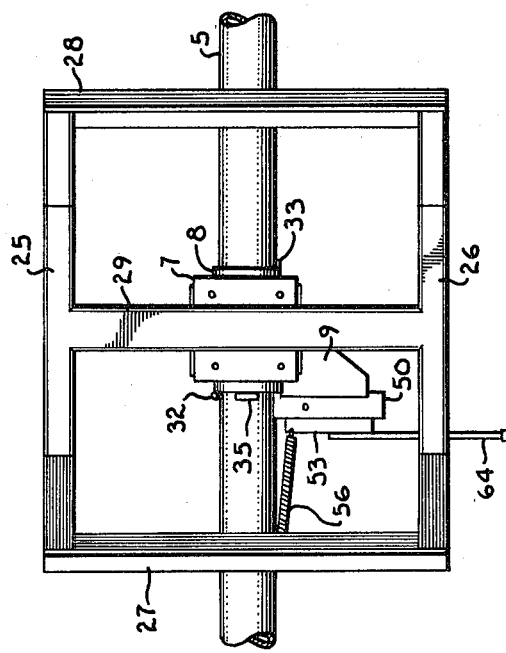

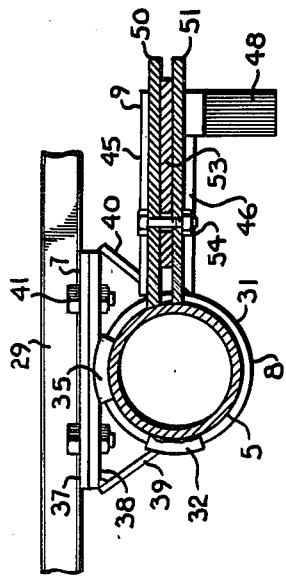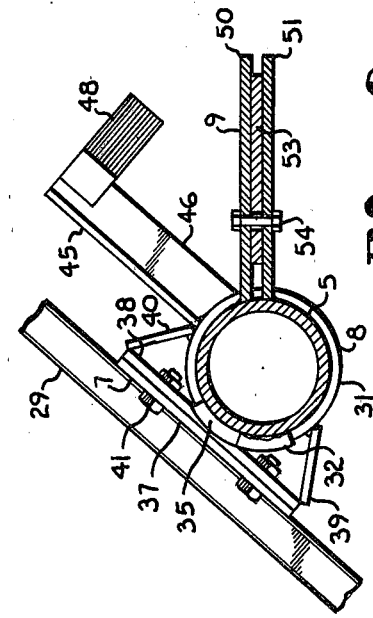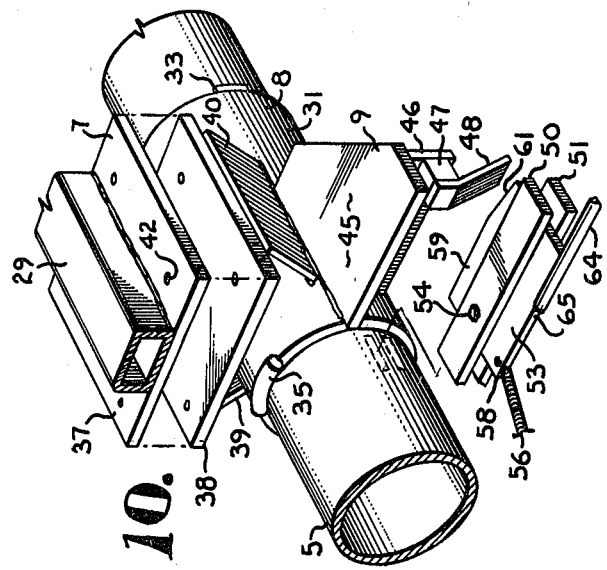

BALE TRANSFER CARRIER

This invention relates to agricultural material tranporting equipment, and in particular, to a carrier for transporting bales of animal forage.

BACKGROUND OF THE INVENTION

Under modern farming methods, products such as hay are presently gathered in the field into relatively large, cylindrical bales weighing between 500 and 2000 pounds. Such bales require specialized loading and transporting equipment for effective handling and are generally specifically structured and configured to accord to the size and weight of the bales. Various types of loading equipment have been devised including "spear" loaders employing a sturdy, pointed shaft which impales the middle of the bale from an end. Other types of loading equipment employ spaced grippers which engage the opposite ends of the bale. The spear loaders typically lift and carry the bale with the bale cylindrical axis aligned with the spear or pointed shaft and the gripping arm loaders usually lift and carry the bale with its cylindrical axis aligned transversely to the loader.

As the loader and the transporter used for carrying the bales must be compatible, some difficulty has been encountered with loading bales onto the bale supporting frames or cradles of a transporter or carrier which have been oriented in a set manner. Further, some bale transporters or carriers have employed relatively bulky and complex mechanical linkage arrangements or hydraulic rams to facilitate unloading of the bale.

OBJECTS OF THE INVENTION

The principal objects of the present invention are: to provide a carrier for transporting a plurality of large, cylindrical bales; to provide such a carrier in which the bales can be loaded thereon by various types of cylindrical bale loading equipment such as of the arm type or the spear type; to provide such a carrier of sufficient structural sturdiness to withstand the weight of a plurality of large cylindrical bales, yet enable conservation of material; to provide such a carrier in which the main frame or body member thereof is an elongate tubular beam extending the length thereof and having a plurality of bale supporting cradles affixed thereto; to provide such a carrier in which the bale supporting cradles are rotatable to position the cylindrical axis of the bale either aligned longitudinally or transversely to the longitudinal axis of the carrier; to provide such a carrier in which the bale supporting cradles tilt sidewardly for unloading of the bale; and to provide such a carrier which is relatively inexpensive, sturdy and efficient in use and particularly well adapted for the intended purpose.

Other objects and advantages of this invention will become apparent from the following description taken in connection with the accompanying drawings wherein are set forth, by way of illustration and example, certain embodiments of this invention.

BRIEF DESCRIPTION OF THE DRAWINGS

FIG. 1 is perspective view of a bale transporting carrier embodying the present invention and shown with supporting cradles thereof in one selected orientation.

FIG. 2 is a side elevational view of the carrier connected to a drafting vehicle and having a plurality of bales supported thereon.

FIG. 3 is a plan view of the bale transporting carrier.

FIG. 4 is an enlarged plan view showing details of a bale supporting cradle and frame member of the carrier.

FIG. 5 is an enlarged, fragmentary view showing details of the connection between the cradle and the carrier body member.

FIG. 6 is an enlarged, fragmentary side elevational view of the cradle and connection to the carrier body member.

FIG. 7 is a sectional view taken along lines 7—7, in FIG. 5.

FIG. 9 is an enlarged sectional view showing a tilting relationship between the cradle and carrier body member.

FIG. 10 is a perspective, disassembled view of connecting portions between the cradle and the carrier frame member.

DETAILED DESCRIPTION OF THE PREFERRED EMBODIMENT

Figure 11:
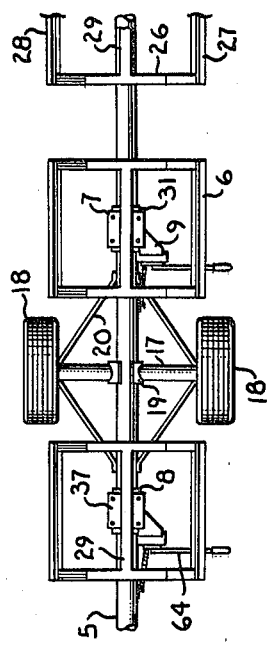
FIG. 11 is a fragmentary plan view of the carrier having the cradles thereof oriented in another selected direction.
Figure 13:
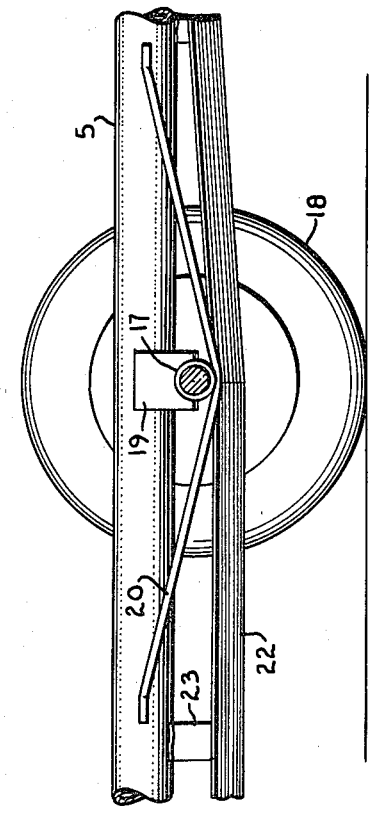
FIG. 13 is an enlarged, fragmentary view showing details of construction of the carrier frame.

A detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 1, 2 and 3, generally indicates a bale transporting carrier embodying the present invention. The carrier is generally in the form of a trailer for drafting behind a vehicle such as a tractor 2 and for transporting large, cylindrical bales of hay 3.

The carrier 1 generally includes a tubular beam member 5 with at least one bale supporting cradle 6 mounted thereto. A rotary mounting means 7 having a generally upright axis of rotation extends between the cradle 6 and the beam member 5 for selectively varying the orientation of the cradle to the beam member. A pivot means 8 extends between the rotary mounting means 7 and the beam member 5 and provides sideward swinging of the cradle 6 relative to the beam member 5 for movement between transport and unloading positions of the carrier 1. A latch means 9 extends between the pivot means 8 and the beam member 5 and is operable to latch the cradle 6 in a position for transporting the bales 3.

In the illustrated example, the carrier 1 has a frame predominantly consisting of the beam member 5. The beam member 5 is tubular the entire length thereof although various segments of different configurations such as rectangular with cylindrical segments can be employed. The beam member 5 has a forward end 11 with a suitable hitch means 12 such as of the straight tongue example illustrated for connection to a draw bar 13 of the tractor 2. Alternatively, the hitch means 12 may be of the gooseneck variety for connection to a vehicle employing a fifth wheel or other such drafting connection means.

A rear end 14 of the beam member 5 has a tail connector 15 for connecting a plurality of carriers 1 in line. A screw jack 16 is mounted adjacent the forward end 11 for support upon disconnection of the carrier 1 from the tractor 2.

The illustrated carrier 1 is of a trailer type and has an axle 17 mounted transversely to the beam member 5 with wheels 18 rotatably mounted on opposite ends of the axle 17. Spaced brackets 19 extend between the axle 17 and the beam member 5 and are connected thereto as by welding for supporting the axle 17. A plurality of braces 20 extend between remote ends of the axle 17 and the beam member 5 and form a diamond shape to restrict movement of the axle 17.

Extending longitudinally below the beam member 5 for substantially the length thereof is an angle beam 22 secured at intervals to the beam member 5 by relatively short legs 23. The angle beam 22 promotes rigidity of the beam member 5 and limits flexing while carrying of the heavy bales 3 and moving over uneven ground surfaces.

Figure 12:
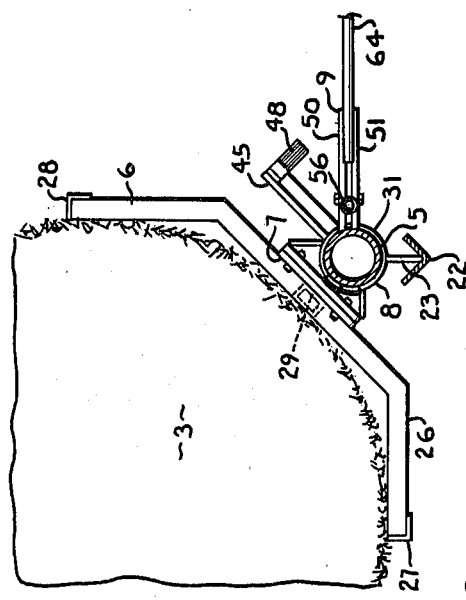
FIG. 12 is an enlarged, fragmentary view showing the cradles as oriented in FIG. 12 tilted sidewardly to unload a bale therefrom.

Each cradle 6 is arcuate in end elevation, FIG. 12, and generally conforms to the shape of a bottom portion of the bale 3 for supporting same. Each cradle 6 has spaced end members 25 and 26 with portions thereof extending upwardly in diverging relationship and spaced side rails 27 and 28 joined to remote ends of the end members 25 and 26 to provide a generally rectangular configuration. A center cross-beam 29 extends between and is secured to the end members 25 and 26 generally at midportions thereof. The midportion of the cross beam 29 is mounted to the beam member 5 through the rotary mounting means 7 and the pivot means 8 to support the cradle 6 on the beam member 5.

In the illustrated example, the pivot means 8 comprises a cylindrical bushing or collar 31 sleeved on the tubular beam member 5 and retained in longitudinal position thereon by abutment members 32 and 33, FIG. 7, respectively positioned at opposite ends of the collar 31 and secured, as by welding, to the outer surface of the beam member 5. To provide a stop for limiting sideward tilting of the cradle 6, the cradle 31 has an abutment member 35 secured to an end margin thereof, as by welding, which rotates with the collar 31 and contacts the abutment member 32, FIG. 9, and limits rotation of the collar 31 relative to the beam member 5.

Means are provided for limiting rotation of the collar 31 relative to the beam member 5 in the other rotational direction and are described below.

The rotary mounting means 7 is affixed to the collar 31 and, in the illustrated example, includes coordinating mating members such as in the form of upper and lower plates 37 and 38. The upper plate 37 is secured, as by welding, to the lower surface of the cradle cross bar 29 at a mid portion thereof and the lower plate 38 is secured, as by welding, to the collar 31. Gussets 39 and 40 extend between outward margins of the lower plate 38 and the collar 31 to provide supportive bracing. The fastener means extends between the upper and lower plates 37 and 38 for selectively varying the orientation of the two plates and therefore, varying the orientation of the cradle 6 to the beam member 5. In the illustrated example, the fastener means includes a plurality of bolts and nuts 41 which are manipulated to selectively connect and disconnect the upper and lower plates 37 and 38. The bolt and nut fasteners 41 extend through a hole pattern 42 including a plurality of bores which are aligned when the cross bar 29 is oriented transversely to the beam member 5, FIG. 7, or when aligned longitudinally therewith, FIG. 10.

To change the orientation of the cradle 6 relative to the beam member 5, the fasteners 41 are simply disconnected and the outward portions of the cradle 6 grasped and rotated, causing the upper and lower plates 37 and 38 to pivot relative to each other and move the fastener hole pattern 42 into aligned relationship in the other desired position. The fasteners 41 are then reconnected. Rotation through about 90 degrees of arc is required to reorient the cradle 6 to the beam member 5 from a position wherein the bale 3 is supported with its cylindrical axis aligned transversely to the longitudinal axis of the beam member 5 or with its cylindrical axis aligned parallel thereto.

Figure 8:
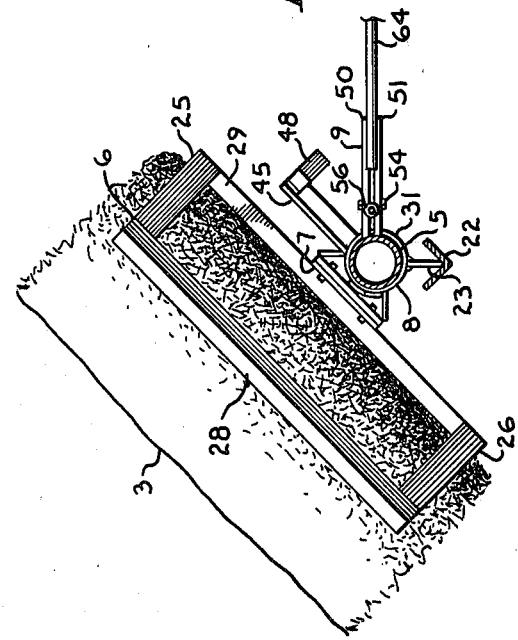
FIG. 8 is an enlarged fragmentary view of the cradle oriented as shown in FIG. 4 and illustrating unloading of a bale therefrom.

The latch means 9 is selectively operable to permit the pivot means 8 to rotate and tilt the cradle from a transporting position, FIG. 1, to an unloading position in either a bale cylindrical axis transversely aligned orientation, FIG. 8, or a bale cylindrical axis longitudinally aligned orientation, FIG. 12. In the former, the bale is unloaded and deposited on an end thereof and in the latter, the bale is unloaded and deposited on an outer cylindrical surface or side.

In the illustrated example, the latch means 9 extends between the collar 31 and beam member 5 and includes arms with coordinating tongue and groove portions respectively connected to the collar 31 and the beam member 5 and operable to latch the cradle 6 in the transport position, FIG. 1. An arm 45 is secured to the collar 31, as by welding, and extends radially outward thereof. The arm 45 is generally planar and positioned parallel to the lower plate 38. A flange 46 depends downwardly from the arm 45 generally at a right angle and is secured thereto also by welding. A spacer block 47 and a downwardly angled ramp 48 are affixed to the flange 46 at an outward end thereof whereby a groove is formed between an overlying portion of the arm 45 and the spacer block 47.

A second arm arrangement extends outwardly of the beam member 5 and includes upper and lower arms 50 and 51 having an inner end connected, as by welding, to the beam member 5, extending radially outwardly and having an outer end terminating adjacent the outer termination of the arm 45. A planar tongue 52 is positioned between the upper and lower arms 50 and 51 and pivotally mounted thereto as by a bolt 54 offset from the middle of the tongue 53 and positioned toward the beam member 5. A biasing means, such as coil spring 56, has one end secured to the beam member 5 by a hook 57 welded thereto and the other end secured to the tongue 53 at a corner 58 so as to rotate the tongue 53 about the pivot bolt 54 and swing an inner edge 59 inwardly for insertion into the groove formed between the arm 45 and the spacer block 47. A radially outward portion of the tongue inner edge 59 is inclined at 61 to promote smooth sliding action with the ramp 48 and latching engagement between the arm 45 and the spacer block 47. When the tongue 53 is engaged in the groove, sideward tilting of the collar 31 and the cradle 6 is prevented by surface to surface abutment between the arm 45 and the tongue inner edge 59.

To facilitate disengagement of the tongue 53 from the groove, an elongate handle 64 is affixed to and extends outwardly of an outer edge 64 of the tongue. The handle 64 is grasped and manipulated to swing the tongue inner edge 59 from engagement in the groove.

In the use of the bale transporting carrier 1, the cradles 6 are aligned as desired by disconnection and reconnection of the rotary mounting means 7 including the upper and lower plates 37 and 38 so that the bale cylindrical axis extends either transversely or parallel to the carrier longitudinal axis. The bales 3 are loaded onto the cradles 6 by various bale handling apparatus such as spear point loaders or grip arm loaders. After transportation by the carrier 1 to a suitable site, the bales are unloaded from the carrier 1 merely by grasping and swinging the handle 64 away from the arm 45 to rotate the tongue 53 from engagement with the groove formed by the arm 45 at the spacer block 47. Under the force of gravity, or upon gentle nudging, the cradle 6 is tilted, FIGS. 8 and 12, to deposit the bale 3 either on an end or on a side, depending upon the orientation of the cradle 6. As the collar 31 rotates, tilting of the cradle 6 is limited by engagement between the stops or abutment members 32 and 35, FIG. 9.

After the bale has been unloaded, the cradle 6 is swung manually to the transport position. Upon downward swinging, the ram 48 slides over the inclined portion 61 of the tongue 53 to the rotational position wherein the tongue slides between the spacer block 47 and the arm 45. The arm 45 limits swinging or tilting movement of the cradle 6 in the opposite direction. The cradle is now ready to receive another bale.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A carrier for a cylindrical bale of hay comprising:
(a) an elongate, tubular main body member having a forward end with a hitch means for connection to a drafting vehicle;
(b) an axle and wheels mounted to said main body member for movement over a ground surface;
(c) a bale supporting cradle mounted to said main body member;
(d) a collar rotatably sleeved on said main body member with said cradle affixed to said collar and swingable sidewardly thereon between transport and unloading positions;
(e) a latch means extending between said collar and said main body member and operable to lock said collar in said transport position;
(f) abutment members affixed to said main body on opposite sides of said collar and limiting any tendency toward longitudinal sliding thereof along said main body member; and
(g) said collar having a stop thereon and engageable with one of said abutment members for limiting rotation of said collar on said main body member.

2. The carrier set forth in claim 1 wherein:
(a) said latch means includes arms respectively extending outwardly from said collar and said main body member;
(b) said arms have coordinating interengageable tongue and groove portions for locking said collar at a rotative position relative to said main body member, said rotative position corresponding to said transport position.

3. A carrier for a cylindrical bale of hay comprising:
(a) a main frame including a tubular beam;
(b) a support beam downwardly secured to said beam and extending substantially the length thereof for lending longitudinal support thereto;
(c) a plurality of bale supporting cradles;
(d) each of said bale supporting cradle having a central cross beam;
(e) a plurality of collars individually sleeved about said tubular beam, said collars being in spaced apart longitudinal relationship to each other;
(f) a plurality of rotary mounting means;
(g) each said rotary mounting means extending between one said central cross beam and one of said collars and including a first mating member centrally attached to said central cross beam and a second mating member attached to said one of said collars with a fastener means extending therebetween for maintaining direct engagement between said first mating member and said second mating member and for selectively varying the orientation of each of said cradles longitudinally and transversely to said beam for transport;
(h) each of said collars being rotatable relative to said tubular beam and providing sideward swinging of said cradles relative to said tubular beam between transport and unloading positions;
(i) a plurality of latch means;
(j) each said latch means extending between said one of said collars and said tubular beam and operable to lock said one of said collars in said transport position.
(k) abutment members affixed to said tubular beam on opposite sides of said one of said collars and limiting longitudinal sliding thereof along said tubular beam;
(l) each said one of said collars having a stop thereon and engageable with one of said abutment members for limiting rotation of said one of said collars on said tubular beam.

* * * * *